US006992741B2

(12) United States Patent
Kitson et al.

(10) Patent No.: US 6,992,741 B2
(45) Date of Patent: Jan. 31, 2006

(54) BISTABLE NEMATIC LIQUID CRYSTAL DEVICE

(75) Inventors: Stephen Christopher Kitson, Alveston (GB); Adrian Derek Geisow, Portishead (GB); John Christopher Rudin, London (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

(21) Appl. No.: 10/152,099

(22) Filed: May 21, 2002

(65) Prior Publication Data

US 2002/0196403 A1 Dec. 26, 2002

(30) Foreign Application Priority Data

Jun. 22, 2001 (EP) ................................ 01305148

(51) Int. Cl.
*G02F 1/1337* (2006.01)
*C09K 19/02* (2006.01)

(52) U.S. Cl. ....................... 349/128; 349/129; 349/177

(58) Field of Classification Search ................ 349/128, 349/129, 155, 177
See application file for complete search history.

(56) References Cited

U.S. PATENT DOCUMENTS 4,333,708 A 6/1982 Boyd et al.
4,358,589 A * 11/1982 Schubert et al. ............ 544/179
4,893,907 A 1/1990 Mallinson
5,327,271 A 7/1994 Takeuchi et al.
5,552,611 A 9/1996 Enichen
5,574,593 A 11/1996 Wakita et al.
5,751,382 A 5/1998 Yamada et al.
5,796,459 A * 8/1998 Bryan-Brown et al. ..... 349/132
5,872,611 A 2/1999 Hirata et al.
5,880,801 A * 3/1999 Scherer et al. .............. 349/124
5,880,803 A * 3/1999 Tamai et al. ................ 349/156
6,067,141 A 5/2000 Yamada et al.
6,249,332 B1 * 6/2001 Bryan-Brown et al. ..... 349/129

FOREIGN PATENT DOCUMENTS

EP 56138712 10/1981
EP 02211422 8/1990
EP 05053513 3/1993
EP 05088177 4/1993
EP 0768560 A1 4/1997
EP 10148827 6/1998
EP 11311789 4/1999
EP 1067425 A1 7/1999

(Continued)

OTHER PUBLICATIONS

Thurston, et al., "Mechanically Bistable Liquid Crystal Display Structures", IEEE Trans on Elec. Devices, vol. ED-27, No. 11, pp. 2068-2081.

(Continued)

*Primary Examiner*—Dung T. Nguyen
*Assistant Examiner*—Jeanne Andrea Di Grazio
(74) *Attorney, Agent, or Firm*—Thomas, Kayden, Horstemeyer & Risley, LLP

(57) ABSTRACT

A bistable nematic liquid crystal device includes an array of holes (8) in an alignment layer (6) on at least one cell wall (2). The alignment layer (6) induces a substantially planar local alignment of liquid crystal molecules. The holes (8) have a shape and/or orientation to induce the liquid crystal director adjacent the holes (8) to adopt two different tilt angles in substantially the same azimuthal direction. The arrangement is such that two stable liquid crystal molecular configurations can exist after suitable electrical signals have been applied to the electrodes.

33 Claims, 6 Drawing Sheets

FOREIGN PATENT DOCUMENTS

| | | | |
|---|---|---|---|
| EP | 1094103 | A1 | 4/2001 |
| EP | 1139154 | A1 | 10/2001 |
| GB | 2286467 | A | 8/1995 |
| GB | 2290629 | A | 1/1996 |
| JP | 0200020653 | | 7/2000 |
| WO | WO91/11747 | | 8/1991 |
| WO | WO92/00546 | | 1/1992 |
| WO | WO97/14990 | | 4/1997 |
| WO | WO99/34251 | | 7/1999 |
| WO | WO01/40853 | | 6/2001 |
| WO | WO01/40853 | A1 | 6/2001 |

OTHER PUBLICATIONS

Bryan-Bow n, et al., "Letters to Nature", vol. 399, pp. 338-340.

* cited by examiner

BISTABLE NEMATIC LIQUID CRYSTAL DEVICE

FIELD OF THE INVENTION

This invention relates to bistable nematic liquid crystal devices.

BACKGROUND OF THE INVENTION

Liquid crystal devices typically comprise a pair of opposed, spaced-apart translucent cell walls with liquid crystal ("LC") material between them. The cell walls have transparent electrode patterns for applying fields to align the LC material.

LC materials are rod-like or lath-like molecules which have different optical properties along their long and short axes. The molecules exhibit some long range order so that locally they tend to adopt similar orientations to their neighbours. The local orientation of the long axes of the molecules is referred to as the director. When the director is orientated perpendicular to the plane of the cell walls, this is referred to as homeotropic alignment. Alignment of the director along the plane of the cell walls or at an angle to the plane of the cell walls is referred to respectively as planar homogeneous and tilted homogeneous alignment.

There are three types of LC materials: nematic, cholesteric (chiral nematic), and smectic. The present invention concerns devices using nematic LC materials, which may optionally be chiral or chirally doped.

Typical LC displays which employ nematic LC materials are monostable, application of an electric field causing the LC molecules to align in an "on" state, and removal of the electric field permitting the LC molecules to revert to a pre-determined "off" state. Examples of such monostable modes are twisted nematic (TN), supertwisted nematic (STN) and hybrid aligned nematic (HAN) modes. Each "on" pixel must be maintained above an electric field threshold, which can cause problems in the matrix addressing of complex displays. These problems can be overcome by driving each pixel by a thin film transistor (TFT), but manufacturing large area TFT arrays is difficult and adds to manufacturing costs.

A number of bistable LC devices have been proposed in which a nematic LC has more than one stable orientation of the director, and can be switched between two stable states when addressed by suitable waveforms.

U.S. Pat. No. 4,333,708 discloses a multistable LC device in which switching between stable configurations is by the movement of disclinations in response to electric fields.

In WO 91/11747 and WO 92/00546 it is proposed to provide a bistable surface by careful control of the thickness and evaporation of SiO coatings. A first stable planar orientation of the director could be obtained, and a second stable orientation in which the director is at an azimuthal angle (in the plane of the surface) of 90° to the first orientation in the plane of the surface, and tilted by around 30°.

It has been proposed, in GB 2,286,467, to achieve an azimuthal bistable surface by using a bigrating surface in which the director is planar to the surface and two surface orientations are stabilised by precise control of the dimensions of the grating.

In "Mechanically Bistable Liquid-Crystal Display Structures", R N Thurston et al, IEEE Trans. on Elec. Devices, Vol. ED-27, No. 11, November 1980, there are described two bistable nematic LC modes which are called "vertical-horizontal" and "horizontal-horizontal". In the vertical-horizontal mode, both cell walls are treated to give a roughly 45° tilt which permits the directors to be switched between two states in a plane which is perpendicular to the major surfaces of the device. In the horizontal-horizontal mode, the director is switchable between two angles in a plane parallel to the major surfaces of the device.

WO 97/14990 and WO 99/34251 describe the use of a monograting surface with a homeotropic local director, which has two stable states with different tilt angles within the same azimuthal plane. The homeotropic alignment is achieved by creating the monograting in a layer of material which causes spontaneous homeotropic orientation or, more practically, by coating the grating surface with a homeotropic inducing alignment agent such as lecithin. WO 01/40853 describes similar display technology in which small alignment areas having local homeotropic alignment are formed by a plurality of surface features such as grating areas, protrusions, or blind holes, and may be separated by areas of monostable alignment. Within each area there may be a graded variation so that the amount of scattering is dependent on amplitude of applied voltage, thus giving a greyscale effect.

We have now found that a bistable nematic LC device may be constructed using an alignment layer which induces substantially planar local alignment and which has an array of holes that are shaped so as to permit the director to adopt either of two tilt angles in substantially the same azimuthal direction. The cell can be switched between the two tilt states by an applied electric field to display information which can persist after the removal of the field.

The term "azimuthal direction" is used herein as follows. Let the walls of a cell lie in the x,y plane, so that the normal to the cell walls is the z axis. Two tilt angles in the same azimuthal direction means two different director orientations in the same x,z plane, where x is taken as the projection of the director onto the x,y plane.

SUMMARY OF THE INVENTION

According to an aspect of the present invention there is provided a bistable nematic liquid crystal device comprising:

- a first cell wall and a second cell wall enclosing a layer of nematic liquid crystal material;
- electrodes for applying an electric field across at least some of the liquid crystal material;
- an alignment layer on the inner surface of at least the first cell wall, comprising a material having a surface the chemical nature of which is such as to induce adjacent liquid crystal molecules to adopt a substantially planar alignment; wherein the alignment layer has an array of holes therein which have a shape and/or orientation to induce the director adjacent each hole to adopt two different tilt angles in substantially the same azimuthal direction;
- the arrangement being such that two stable liquid crystal molecular configurations can exist after suitable electrical signals have been applied to the electrodes.

The invention provides a robust display device with relatively fast bistable switching. Voltage pulses of around 50 $\mu$s duration are adequate to cause switching.

We have surprisingly found that the orientation of the director is induced by the geometry of the holes, rather than by the array or lattice.

The holes may have substantially straight sides, either normal or tilted with respect to the major planes of the device, or the holes may have curved or irregular surface shape or configuration.

The director tends to align locally in an orientation which depends on the specific shape of the hole. For an array of square holes, the director may align along either of the two diagonals of the squares. If another shape is chosen, then there may be more than two azimuthal directions, or just one. For example an equilateral triangular hole can induce three directions substantially along the angle bisectors. An oval or diamond shape, with one axis longer than the others, may induce a single local director orientation which defines the azimuthal direction. It will be appreciated that such an orientation can be induced by a very wide range of hole shapes. Moreover, by tilting a square hole along one of its diagonals it is possible to favour one direction over another. Similarly, tilting of a cylindrical hole can induce an alignment in the tilt direction.

Because the local director orientation is determined by the geometry of the holes, the array need not be a regular array. In a preferred embodiment, the holes are arranged in a random or pseudorandom array instead of in a regular lattice. In a regular lattice, the spacing between neighbouring features is constant. In a random array, the spacing between any particular pair of neighbouring features cannot be predicted from the spacing of any of the other features in the array. In a pseudorandom array, the spacing of any particular pair of neighbouring features cannot be easily predicted from the spacing of other nearby features without knowledge of the process used to generate the spacing, but there may be a large scale repeating pattern. The generation of random and pseudorandom numbers with desirable properties is well known, for example in the arts of cryptography, statistics and computer programming. An example process for generating a pseudorandom array would be to start with a regularly spaced array and move each feature by a pseudorandom fraction of the regular spacing. This arrangement has the benefit of eliminating diffraction colours which may result from the use of regular structures. Such an array can act as a diffuser, which may remove the need for an external diffuser in some displays. Of course, if a diffraction colour is desired in the display, the array may be made regular, and the holes may be spaced at intervals which produce the desired interference effect. Thus, the structure may be separately optimised to give the required alignment and also to mitigate or enhance the optical effect that results from a textured surface.

The alignment layer may be continuous or discontinuous. It is preferably formed from a dielectric material to prevent conduction between adjacent electrode patterns on the first cell wall. However, the alignment layer could also be formed from other suitable materials, for example a conducting polymer or a metal. For convenience hereinafter, the invention will be described with reference to an alignment layer which is formed from a dielectric material.

The layer and the holes may be formed by any suitable means; for example by photolithography, embossing, casting, injection moulding, or transfer from a carrier layer. It is not necessary to treat the surfaces defining the holes with a coating to induce homeotropic alignment.

In one embodiment some degree of twist is induced in the LC director, which may improve the optical characteristics of the device. The twist may be induced by using LC materials which are chiral or which have been chirally doped. Additionally, or alternatively, twist may be induced by treating the inner surface of the second cell wall to induce a planar or tilted planar alignment which is at a non-zero angle with respect to the azimuthal direction induced by the features on the first cell wall.

The inner surface of the second cell wall could have low surface energy so that it exhibits little or no tendency to cause any particular type of alignment, so that the alignment of the director is determined essentially by the features on the first cell wall. However, it is preferred that the inner surface of the second cell wall is provided with a surface alignment to induce a desired alignment of the local director. This alignment may be homeotropic, planar or tilted. The alignment may be provided by an array of holes similar to that of the first cell wall, or by conventional means, for example rubbing, photoalignment, a monograting, or by treating the surface of the wall with an agent to induce homeotropic alignment. The second cell wall is preferably treated to induce a substantially homeotropic local alignment. Homeotropic alignment may be achieved by well known surface treatments such as lecithin, a chrome complex, or a homeotropic polyimide. In this mode, it is also desirable to use a nematic LC of negative dielectric anisotropy, to facilitate switching from a lower energy high tilt state to a higher energy low tilt state. We have found that bistable switching occurs with arrays of holes on both inner cell wall surfaces. With suitable electrode arrangements it should be possible to get switching with positive dielectric anisotropy LC materials. For convenience, the invention will be described hereinafter with reference to a negative LC material and homeotropic alignment on the second cell wall, but it is to be understood that the invention is not limited to this embodiment.

In use, the device will be provided with means for distinguishing between switched states of the liquid crystal material. For example a polariser and an analyser may be mounted either side of the LC cell in a manner well known to those skilled in the art of LCD manufacture. When viewed between crossed polarisers with the aziumthal alignment direction at 45° to the polarisers, the high tilt state appears dark and the low tilt state appears bright because of its increased birefringence. Alternatively, a pleochroic dye may be dissolved in the LC material, and a single polariser may optionally be mounted on the cell. However, the device may be manufactured and sold without polarisers or other distinguishing means.

The holes may be of any depth which permits the LC material to adopt two different tilt states. These depths will differ with different hole shapes and widths, LC materials and cell characteristics. A preferred depth range is 0.5 to 5 $\mu$m, notably 0.9 to 1.5 $\mu$m for a cell gap of about 3 $\mu$m. If the holes are shallow then the states become more planar in nature and if the holes are deep then the states become more homeotropic.

The holes may be of any convenient width (size). A preferred width range is 0.2 to 3 $\mu$m. The holes are preferably spaced apart from each other by between 0.1 and 5 $\mu$m.

The holes may be provided on one cell wall only, or they may optionally be provided on both cell walls.

The alignment layer may optionally be provided with pillars or other projections for providing cell spacing. Conventional spacing means well known in the art may be employed to set the cell spacing, for example microspheres or pieces of glass fibre. The alignment layer may itself set the spacing, so that the cell essentially comprises a sandwich of the alignment layer between the first and second cell walls, with the LC disposed in the holes.

The cell walls may be formed from glass, or from a rigid or non-rigid plastics material, for example PES, PET, PEEK, or polyamide.

It is preferred that one electrode structure (typically a transparent conductor such as indium tin oxide) is provided on the inner surface of each cell wall in known manner. For example, the first cell wall may be provided with a plurality of "row" electrodes and the second cell wall may be provided with a plurality of "column" electrodes. However, it would also be possible to provided planar (interdigitated) electrode structures on one or both walls, preferably just the first cell wall.

Where the material between the holes forms a continuous network, it would also be possible to have electrodes on top of the microstructure as well as underneath it, as taught in EP 1 067 425.

The shape and/or orientation of the holes is preferably such as to favour only one azimuthal director orientation adjacent the features. The orientation may be the same for each hole, or the orientation may vary from hole to hole so as to give a scattering effect in one of the two states.

It is known that adding a small quantity of surfactant oligomer to an LC can improve the switching. See, for example, WO 99/18474 and G P Bryan-Brown, E L Wood and I C Sage, *Nature* Vol. 399 p338 1999. We expect that addition of a suitable surfactant will also improve switching of a device in accordance with the present invention.

BRIEF DESCRIPTION OF THE DRAWINGS

The invention will now be further described by way of example, with reference to the following drawings in which.

DETAILED DESCRIPTION

Figure 1:
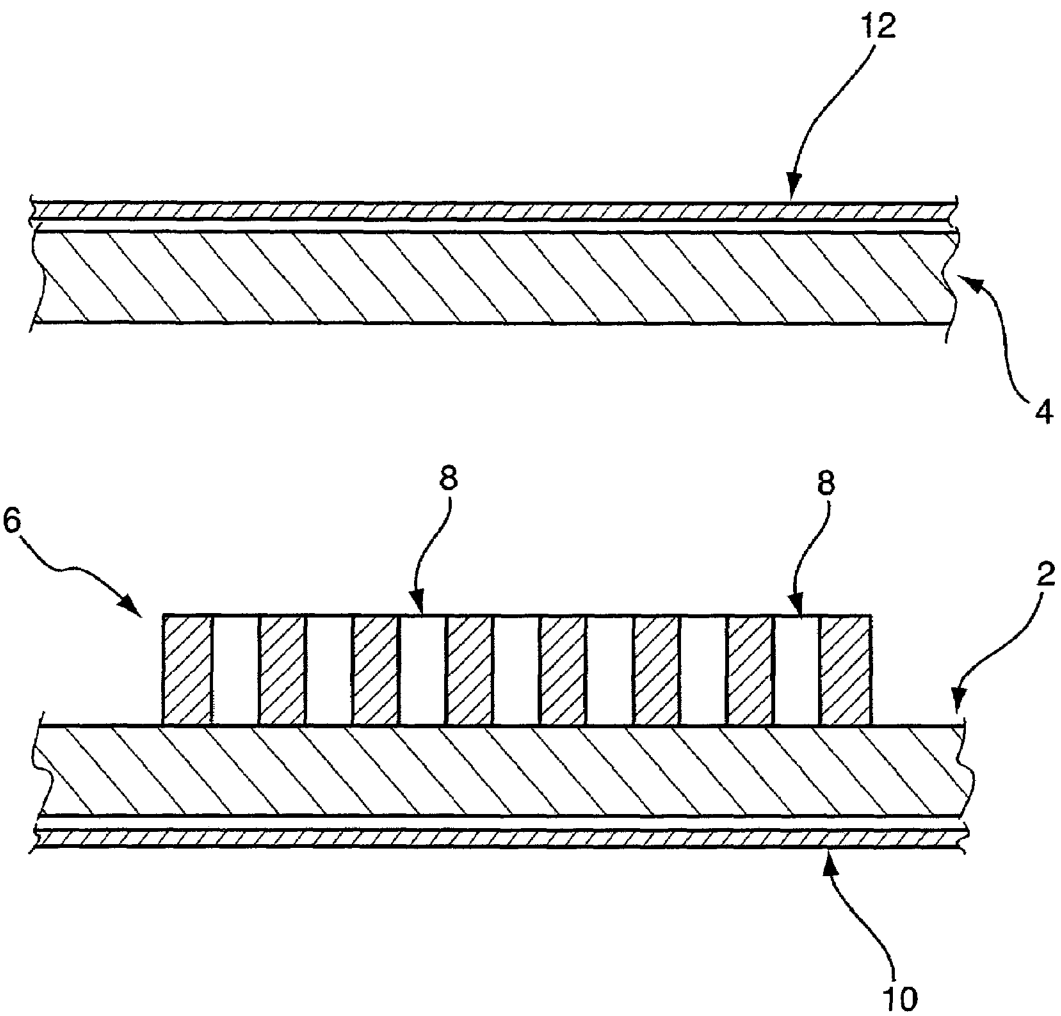
FIG. 1 is a schematic cross section through a Bistable LCD having an array of holes for alignment in accordance with the present invention.

The bistable nematic cell shown schematically in FIG. 1 comprises a first cell wall 2 and a second cell wall 4 which enclose a layer of nematic LC material of negative dielectric anisotropy. The inner surface of each cell wall is provided with a transparent electrode pattern (not shown), for example row electrodes on the first cell wall 2 and column electrodes on the second cell wall 4, in a known manner.

Figure 2:
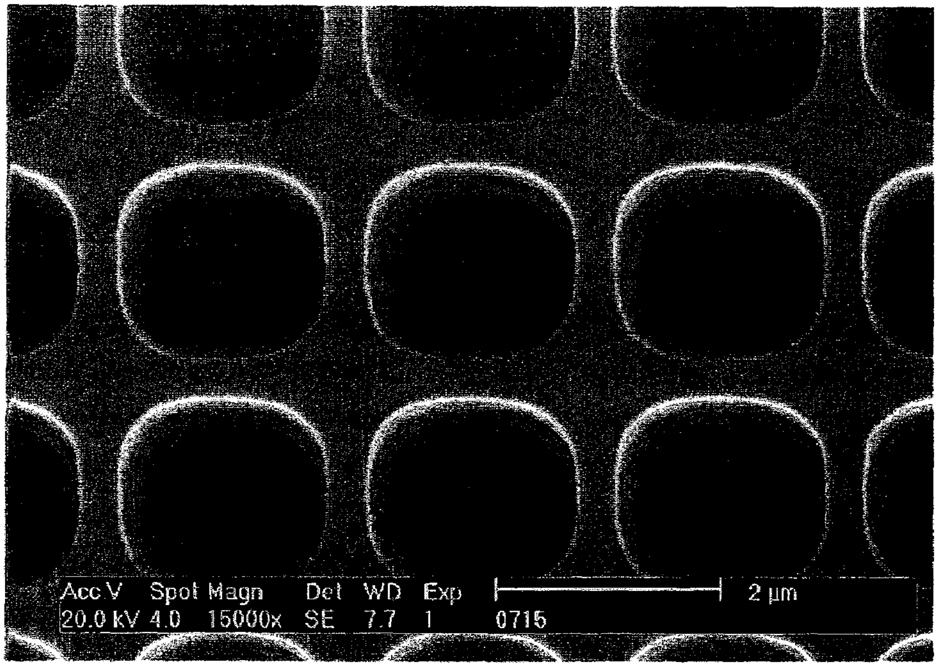
FIGS. 2 and 3 are SEM photomicrographs of an array of holes in a alignment layer suitable for use in the present invention.
Figure 3:
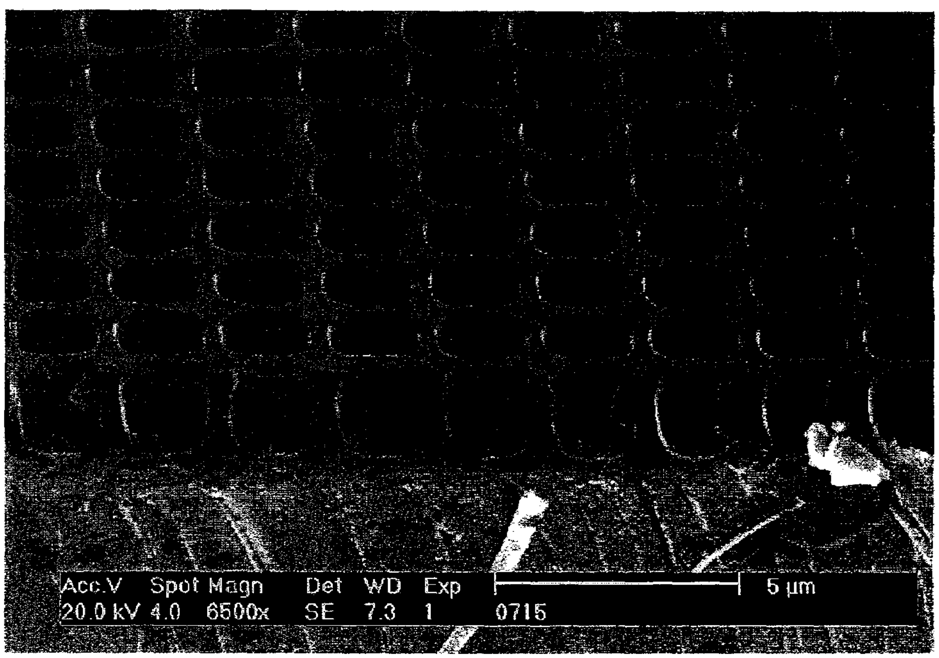

The inner surface of the first cell wall 2 is provided with a layer 6 of a dielectric material in which is formed a regular array of square holes 8, and the inner surface of the second cell wall 4 is flat. The holes 8 are approximately 1 $\mu$m deep and the cell gap (wall to wall) is typically 2 to 4 $\mu$m. The flat surface is treated to give homeotropic alignment. The holes 8 and alignment layer 6 are not homeotropically treated. The chemical nature of the surface is such that the LC adopts a substantially planar alignment adjacent to the surface. SEM photomicrographs of an experimental array of holes in an alignment layer are shown in FIGS. 2 and 3.

Such an array of square holes has two preferred alignment directions in the azimuthal plane, along the two diagonals of the hole. This alignment within the hole then propagates into the bulk of the LC above the hole such that the average orientation is also along that diagonal.

Figure 4:
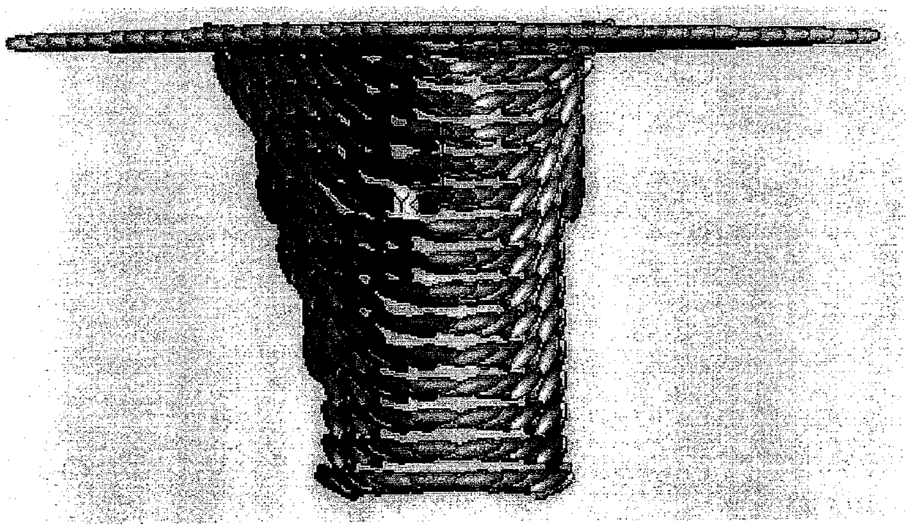
FIGS. 4 and 5 show computer-generated models of LC alignment in, respectively, low-tilt and high-tilt states in holes in accordance with the invention.
Figure 5:
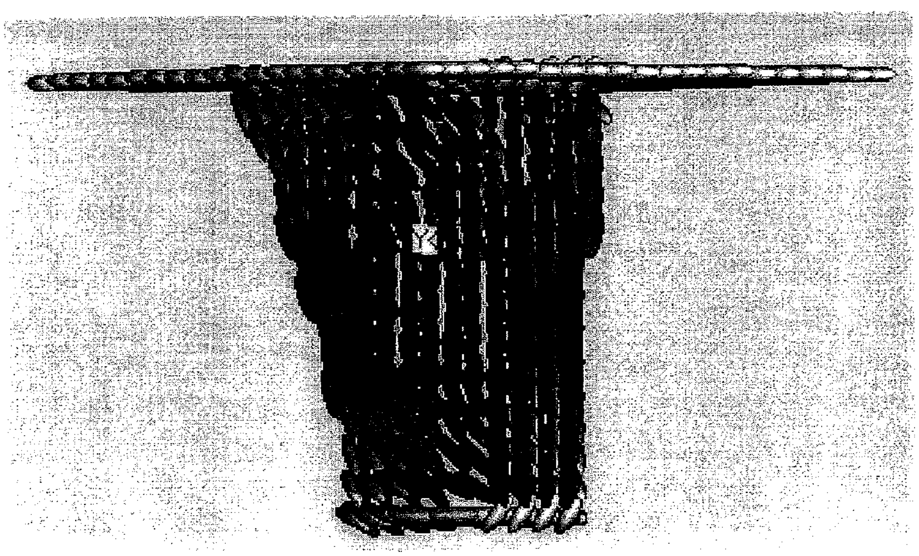

By tilting the holes along one of the diagonals it is possible to favour that alignment direction. Through computer simulation of this geometry we found that although there is only one azimuthal alignment direction there are in fact two states with similar energies but which differ in how much the LC tilts. FIGS. 4 and 5 are computer-generated models of a cross section through a hole, with the LC in the two states. The cross section is in the x,z plane. The ellipses represent the LC molecules with the long axis corresponding to the local director. The hole depth is about 1 $\mu$m.

In one state (FIG. 4) the LC has a lower tilt, being almost planar in the middle, and in the other (FIG. 5) it is highly tilted. The exact nature of the LC orientation depends on the details of the structure, but for a range of parameters there are two distinct states with different magnitudes of tilt away from the cell normal. The two states may be distinguished by viewing through a polariser 12 and an analyser 10. The low tilt state has high birefringence and the high tilt state has low birefringence. Providing the holes with a sufficient blaze angle along the diagonal also serves to eliminate reverse tilt states. Preferably the blaze angle is at least 3°, depending on the nature of the LC and the cell gap.

Without limiting the scope of the invention in any way, we think that the two states may arise because of the way in which the LC director is deformed by the hole. Deforming around the inner walls of a hole causes regions of high energy density at the leading and trailing vertical edges of the hole where there is a sharp change in direction. This energy density is reduced if the LC molecules are tilted because there is a less severe direction change. This is clear in the limit of the molecules being homeotropic throughout the hole. In that case there is no region of high distortion at the vertical edges of the holes. In the higher tilt state this deformation energy is therefore reduced, but at the expense of a higher bend/splay deformation energy at the transitions from flat surfaces at the bottom of the holes and on the tops of the walls between the holes. The LC in contact with these surfaces is untilted but undergoes a sharp change of direction as it adopts the tilt of the LC in the bulk of the cell.

In the low tilt state the energy is balanced in the opposite sense, with the high deformation around the leading and trailing edges of the hole being partially balanced by the lack of the bend/splay deformation at the horizontal surfaces in and around the hole because the tilt is more uniform within the hole. Our computer simulations suggest that, for the current configuration, the higher tilt state is the lower energy state. The exact amount of tilt in each state will be a function of the elastic constants of the LC material and the anchoring energy of the hole material. The term "horizontal" is used herein to refer to a surface which is substantially parallel to the major surfaces of the cell walls, and the term "vertical" is used to refer to a direction normal to those surfaces.

Figure 6:
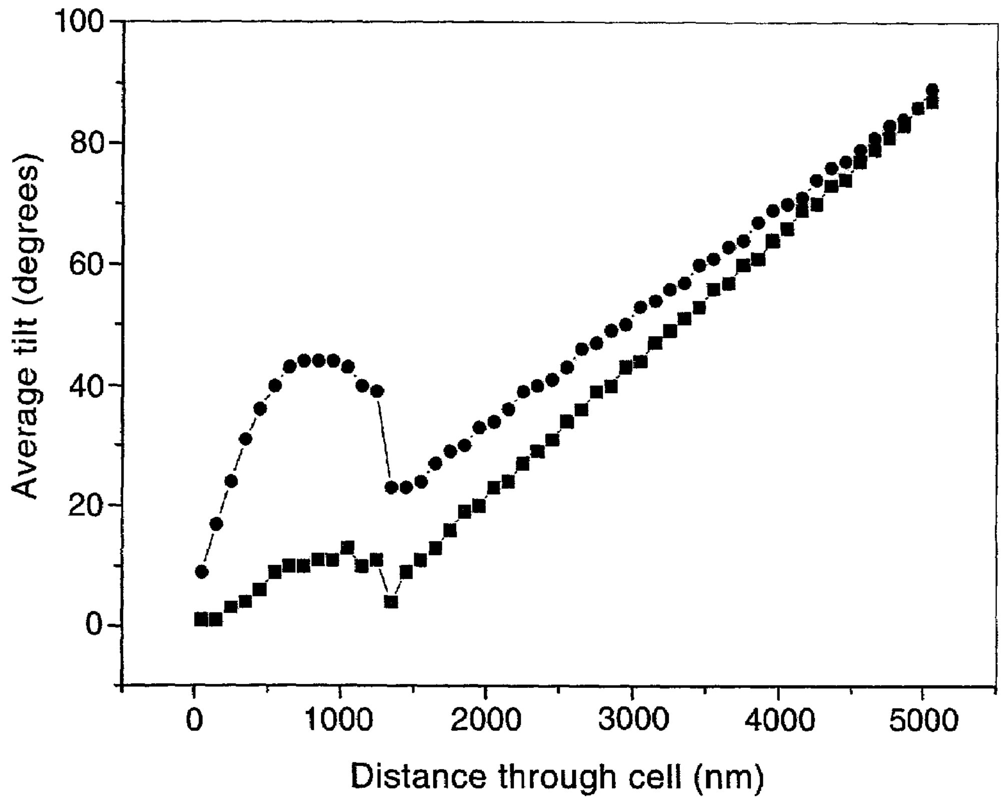
FIG. 6 shows modelled tilt profiles for low- and high-tilt states as a function of distance through a cell.

Referring now to FIG. 6, there is shown a computer-generated model of tilt profiles for the two states for different distances through a 5 $\mu$m thick cell. As can be seen, the difference in tilt progressively reduces above the holes, and converges at 90° at the second cell wall 4 which is modelled as having a homeotropic alignment treatment. Switching between the two states is achieved by the application of suitable electrical signals.

Figure 9:
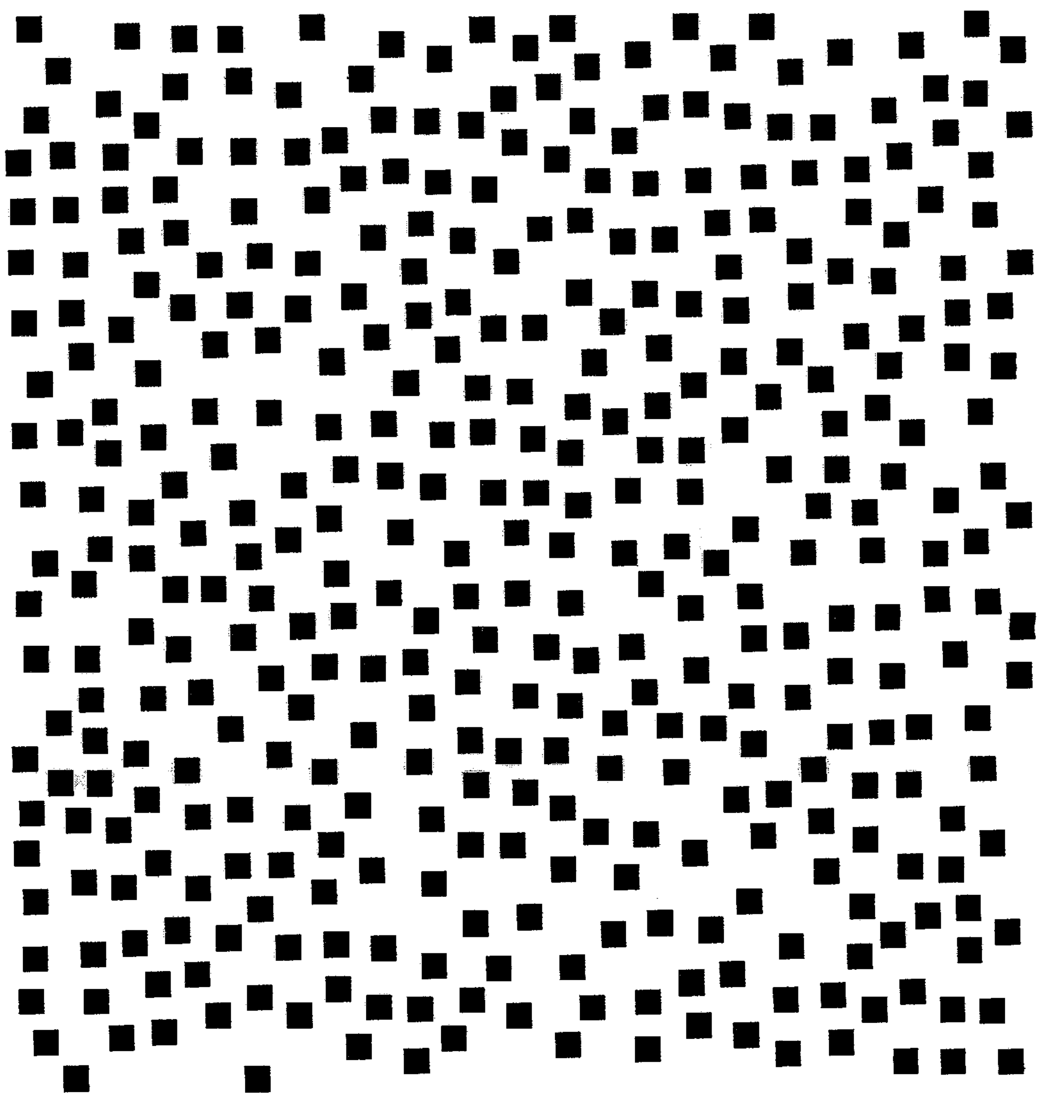
FIG. 9 is a plan view of a unit cell of a device in accordance with the present invention, having holes in a pseudorandom array.

FIG. 9 shows a pseudorandom array of holes for an alternative embodiment of the invention, which provides bistable switching without interference effects. Each square hole is about 0.8×0.8 μm, and the pseudorandom array has a repeat distance of 56 μm.

Cell Manufacture

A clean glass substrate 2 coated with Indium Tin Oxide (ITO) was spin-coated with a suitable photoresist (Shipley S1813) to a final thickness of 1.4 μm. Immediately after spin-coating, the substrate was soft baked on a hotplate at 95° C. for 1 minute.

A photomask (Compugraphics International PLC) with an array of square transmitting regions in a square array, was brought into hard contact with the substrate and a suitable collimated UV source was used to expose the photoresist for 60 s at 0.1 $mW/cm^2$. The mask used had 1.5 μm wide squares separated by 0.7 μm. The substrate was developed using Microposit Developer diluted 1:1 with deionised water for approximately 60 s and rinsed dry. The substrate was flood exposed using a 365 nm UV source for 1 minute at 1 $mW/cm^2$, and baked at 85° C. for 1 hour. The substrate was then deep UV cured using a 254 nm UV source at ~50 $mW/cm^2$ for 1 hour, followed by hard baking in a vacuum oven. The oven temperature was no higher than 85° C. when the substrate was placed in it. The temperature was then ramped up to 180° C. at 3° C./min and held there for 1 hour before being slowly lowered to ambient. By exposing through the mask using a UV source at an offset angle to the normal to the plane of the cell wall, tilted holes could be produced. An offset angle of about 10° along one of the hole diagonals was used. The tilt angle (or blaze angle) is related to the offset angle by Snell's law. Exposure to the developer will also affect the shape of the holes. The final holes were a little wider than the mask dimensions, probably due to some light leakage into the wall regions. The alignment layer shown in FIG. 3 was cleaved to better illustrate the shape of the holes.

A second clean ITO substrate 4 with electrode patterns was treated to give a homeotropic alignment of the liquid crystal using a polyimide (Nissan 1211) in a known manner. The polyimide was applied by spin-coating at 4000 rpm for 30 seconds. For a 1" (25.4 mm) square substrate, about 100 μl was deposited while the substrate was spun. The substrate was soft baked on a hotplate at 95° C. for one minute and then hard baked at 180° C. for one hour.

An LC test cell was formed using suitable spacer beads (Micropearl) contained in UV curing glue (Norland Optical Adhesives N73), and cured using a 365 nm UV source. The glue was applied in a region of the device where there was no photoresist so that the cell spacing was between the bare ITO on the first substrate 2 and the polyimide on the second substrate 4. The cell was capillary filled with a nematic liquid crystal mixture (Merck ZLI 4788-000). Filling was accomplished with the LC in the isotropic phase at 95° C. followed by rapid cooling. Methods of spacing, assembling and filling LC cells are well known to those skilled in the art of LCD manufacture, and such conventional methods may also be used in the spacing, assembling and filling of devices in accordance with the present invention.

EXPERIMENTAL RESULTS

Figure 7:
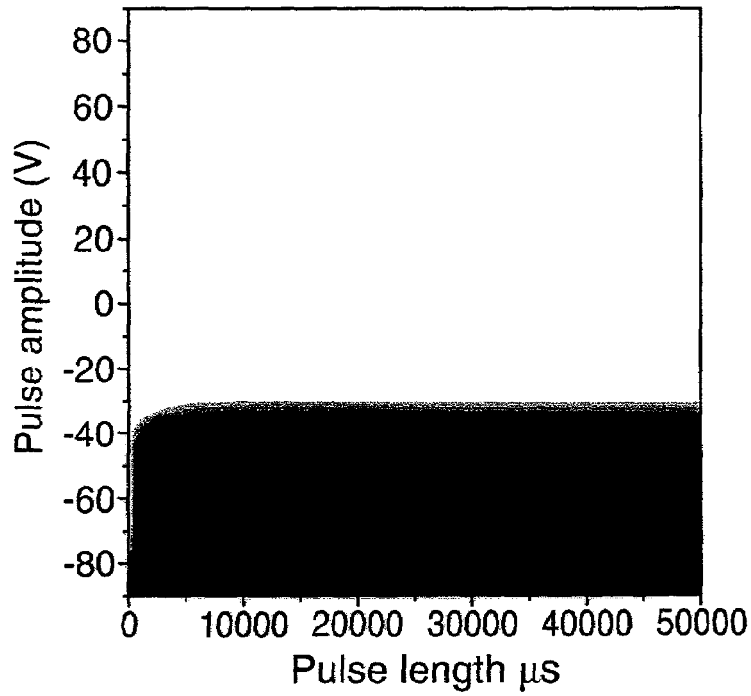
FIG. 7 shows change in transmission of an experimental cell in accordance with the invention, as a function of pulse length and amplitude, for switching from a low tilt to a high tilt state.
Figure 8:
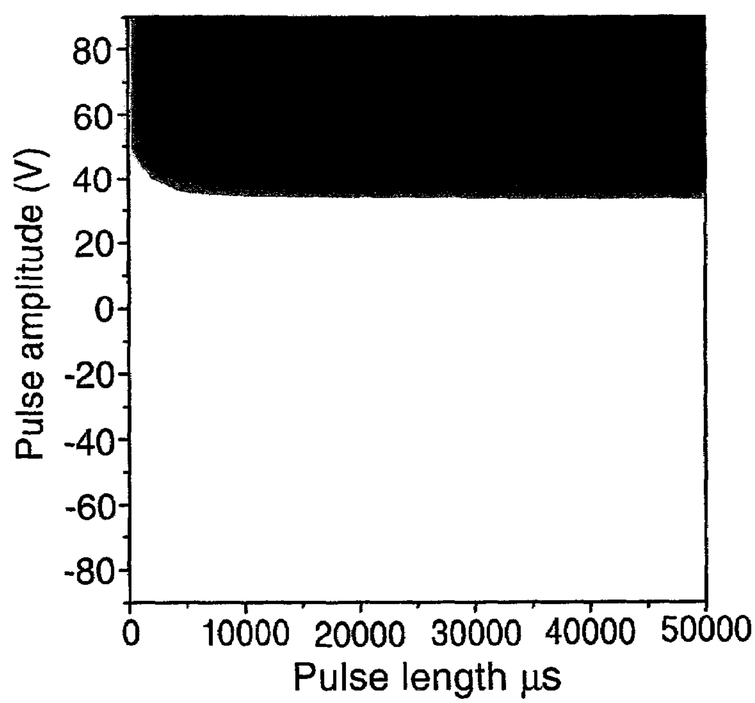
FIG. 8 is similar to FIG. 7, but showing switching from a high tilt to a low tilt state.

FIGS. 7 and 8 show the switching response of a bistable cell recorded at 30° C. The cell had the following characteristics:

cell gap: 3 μm
hole depth: 1.4 μm
hole width: 1.5 μm
holes are arranged on a square lattice with a spacing of 0.7 μm between each
offset angle: 8° along one of the diagonals of the holes
LC: ZLI 4788-000 (Merck).

Monopolar pulses were applied to the cell and the effect on the transmission was recorded. Each test pulse was of an amplitude V and a duration τ. Before each test pulse was applied to the cell a reset pulse was applied to ensure that the cell always started in the same state. The transmission was then measured. The test pulse was then applied and the transmission re-measured and compared to the starting transmission. In FIGS. 7 and 8 white indicates pulses that gave no change in transmission and black indicates regions that did switch the cell. Switching is sign dependent, with a simple threshold.

Both states are extremely stable. Without being bound by theory, we believe that being confined within micron-scale holes restricts any macroscopic flow of the LC, making the device very tolerant of mechanical deformation.

Different square cross-sections have been tried (each with a 0.7 μm gap between squares), as follows: 0.7, 1.5, 2.0 and 3.0 μm. The 1.5 μm width worked best of those tested. Cell gaps (measured from ITO to ITO) of 3 and 5 μm were also tested and worked well.

We claim:

1. A bistable nematic liquid crystal device comprising:

a first cell wall and a second cell wall enclosing a layer of nematic liquid crystal material;

electrodes for applying an electric field across at least some of the liquid crystal material;

an alignment layer on the inner surface of at least the first cell wall, comprising a material which induces adjacent liquid crystal molecules to adopt a substantially planar alignment;

wherein the alignment layer has an array of holes therein which are at least one of shaped and oriented to induce the director adjacent each hole to adopt two different tilt angles in substantially the same azimuthal direction;

the arrangement of the array of holes being such that two stable liquid crystal molecular configurations can exist after suitable electrical signals have been applied to the electrodes.

2. A device as claimed in claim 1, wherein the liquid crystal material has negative dielectric anisotropy.

3. A device as claimed in claim 1, wherein the second cell wall has a surface alignment which induces a substantially homeotropic local alignment of the director.

4. A device as claimed in claim 1, wherein the holes have a depth in the range 0.5 to 5 μm.

5. A device as claimed in claim 4, wherein the holes have a depth in the range 0.9 to 1.5 μm.

6. A device as claimed in claim 1, wherein at least part of the side wall of the holes is tilted with respect to the normal to the plane of the first cell wall.

7. A device as claimed in claim 1, wherein each hole has a width in the range 0.2 to 3 μm.

8. A device as claimed in claim 1, wherein the holes are arranged in a non-regular array.

9. A device as claimed in claim 8, wherein the holes are arranged in one of a random or pseudorandom array.

10. A device as claimed in claim 1, wherein the holes are spaced from 0.1 to 5 μm apart from each other.

11. A device as claimed in claim 10, wherein the holes are spaced from 0.5 to 1.5 μm apart.

12. A device as claimed in claim 1, wherein the alignment layer is formed from a photoresist material.

13. A device as claimed in claim 1, wherein the alignment layer is formed from a plastics material.

14. A device as claimed in claim 1, wherein the liquid crystal material contains a surfactant.

15. A device as claimed in claim 1, wherein the holes are at least one shaped and oriented to favour only one azimuthal director orientation adjacent the holes, and this orientation is the same for each hole.

16. A device as claimed in claim 1, wherein the holes are at least one of shaped and oriented such as to favour only one azimuthal director orientation adjacent the holes, and this orientation varies from hole to hole so as to give a scattering effect in one of the two states.

17. A device as claimed in claim 1, wherein the liquid crystal director twists between the first cell wall and the second cell wall.

18. A device as claimed in claim 1, wherein the alignment layer is formed from a dielectric material.

19. A device as claimed in claim 18, wherein the alignment layer functions as a spacer which separates the first and second cell walls.

20. A device as claimed in claim 1, wherein the holes are substantially square in cross section.

21. A device as claimed in claim 1, wherein the holes are arranged in a regular array.

22. A bistable nematic liquid crystal device comprising:

a first cell wall and a second cell wall enclosing a layer of nematic liquid crystal material of negative dielectric anisotropy;

electrodes on both cell walls for applying an electric field across at least some of the liquid crystal material;

an alignment layer on the inner surface of the first cell wall, comprising a material which induces adjacent liquid crystal molecules to adopt a substantially planar local alignment;

an array of holes in the said alignment layer which are at least one of shaped and oriented to induce the director adjacent each hole to adopt two different tilt angles in substantially the same azimuthal direction; and an alignment structure on the inner surface of the second cell wall which induces adjacent liquid crystal molecules to adopt a substantially homeotropic alignment;

the arrangement of the array of holes being such that two stable liquid crystal molecular configurations can exist after suitable electrical signals have been applied to the electrodes.

23. A device as claimed in claim 20, wherein the substantially square hole induces tilt angles along diagonals of the square hole.

24. A device as claimed in claim 20, wherein the substantially square hole is tilted to favor alignment in one of the directions of the square hole.

25. A device as claimed in claim 1, wherein the holes are substantially triangular in cross section.

26. A device as claimed in claim 24, wherein the substantially triangular holes induce tilt angles along angle bisectors of the triangular hole.

27. A device as claimed in claim 1, wherein the holes are substantially oval in cross section.

28. A device as claimed in claim 27, wherein the substantially oval holes induce tilt angles along a longer axis of the oval hole.

29. A device as claimed in claim 1, wherein the holes are substantially diamond in cross section.

30. A device as claimed in claim 29, wherein the substantially diamond holes induce tilt angles along a longer axis of the diamond hole.

31. A device as claimed in claim 1, wherein the holes are substantially cylindrical in cross section and wherein the substantially cylindrical holes are tilted to favor alignment in a direction of tilt of the cylindrical hole.

32. A device as claimed in claim 1, wherein the alignment layer is a diffuser which eliminates diffraction colours when the holes are pseudorandomly oriented over the alignment layer.

33. A device as claimed in claim 1, wherein the alignment layer facilitates display of a diffraction colour when the holes are regularly oriented over the alignment layer.

* * * * *